US010958011B2

(12) United States Patent
Hayashi et al.

(10) Patent No.: US 10,958,011 B2
(45) Date of Patent: Mar. 23, 2021

(54) WIRE CONTAINER, CONNECTOR ASSEMBLY, AND WATER-RESISTANT CONNECTOR

(71) Applicant: 3M INNOVATIVE PROPERTIES COMPANY, St. Paul, MN (US)

(72) Inventors: Tatsuya Hayashi, Kanagawa Pref. (JP); Shuhei Yokoyama, Yamagata (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 19 days.

(21) Appl. No.: 16/462,336

(22) PCT Filed: Dec. 14, 2017

(86) PCT No.: PCT/IB2017/057941

§ 371 (c)(1),
(2) Date: May 20, 2019

(87) PCT Pub. No.: WO2018/109708

PCT Pub. Date: Jun. 21, 2018

(65) Prior Publication Data

US 2019/0296477 A1 Sep. 26, 2019

(30) Foreign Application Priority Data

Dec. 15, 2016 (JP) ............................ JP2016-243571

(51) Int. Cl.
*H01R 4/24* (2018.01)
*H01R 13/52* (2006.01)
(Continued)

(52) U.S. Cl.
CPC ......... *H01R 13/521* (2013.01); *H01R 4/2416* (2013.01); *H01R 12/675* (2013.01)

(58) Field of Classification Search
CPC . H01R 12/2433; H01R 4/2416; H01R 4/2433
(Continued)

(56) References Cited

U.S. PATENT DOCUMENTS 3,985,416 A * 10/1976 Dola .................... H01R 4/2433 439/403
4,598,969 A * 7/1986 Stephenson ........ H01R 13/6592 439/607.41
(Continued)

FOREIGN PATENT DOCUMENTS

CN 2011-056589 11/2008
JP 60-110982 6/1985
(Continued)

OTHER PUBLICATIONS

International Search report for PCT International Application No. PCT/IB2017/057941 dated Mar. 20, 2018, 5 pages.

*Primary Examiner* — Neil Abrams
(74) *Attorney, Agent, or Firm* — Michael Stern

(57) ABSTRACT

An electrically-insulating wire container is a wire container including one or more pipe-shaped main bodies for containing a plurality of conductors, and within which a plurality of separate, substantially parallel tubular cavities are defined. Each of the tubular cavities includes a forward open end in a forward end portion of the wire container, and a rear open or closed end in a rear end portion on an opposite side of the wire container. The wire container has an integrated structure. The wire container is flexible enough that when the conductors are inserted into the tubular cavities from the long, narrow, and hollow forward open ends, and the wire container is combined with a connector having a plurality of piercing contacts, the piercing contacts penetrate at least one pipe-shaped main body of the wire container and make contact with the conductors.

13 Claims, 7 Drawing Sheets

(51) Int. Cl.
*H01R 4/2416* (2018.01)
*H01R 12/67* (2011.01)

(58) Field of Classification Search
USPC .................................................. 403/403, 417
See application file for complete search history.

(56) References Cited

U.S. PATENT DOCUMENTS

| | | | | | |
|---|---|---|---|---|---|
| 4,954,098 | A * | 9/1990 | Hollingsworth | H01R 4/2433 | 439/404 |
| 5,516,985 | A * | 5/1996 | Merkel | H02G 15/043 | 174/74 A |
| 6,120,317 | A * | 9/2000 | Miquet | H01R 4/2433 | 439/417 |
| 6,462,275 | B1 * | 10/2002 | Daoud | H02G 3/088 | 16/2.1 |
| 8,062,057 | B1 * | 11/2011 | Park | B66B 7/064 | 439/403 |
| 10,819,045 | B2 * | 10/2020 | Tomita | B60R 16/0239 | |
| 2018/0006384 | A1 * | 1/2018 | Hayashi | H01R 4/2433 | |

FOREIGN PATENT DOCUMENTS

| | | |
|---|---|---|
| JP | 07-018357 | 1/1995 |
| JP | H08222291 | 8/1996 |
| JP | H10208797 | 8/1998 |
| JP | 2001-250603 | 9/2001 |
| JP | 2002-246090 | 8/2002 |
| JP | 2003-346579 | 12/2003 |
| JP | 2006-067666 | 3/2006 |
| JP | 2007-317676 | 12/2007 |
| JP | 2012-69314 | 4/2012 |
| JP | 2017-139185 | 8/2017 |
| WO | WO 2010-082967 | 7/2010 |
| WO | WO 2016-133663 | 8/2016 |

* cited by examiner

WIRE CONTAINER, CONNECTOR ASSEMBLY, AND WATER-RESISTANT CONNECTOR

TECHNICAL FIELD

An aspect of the present invention relates to a wire container, a connector assembly, and a water-resistant connector.

BACKGROUND ART

Various types of connectors have been known for some time as connectors that electrically connect a plurality of insulated conductors with another corresponding plurality of insulated conductors. The connector disclosed in Patent Document 1, indicated below, electrically connects a plurality of insulated conductors supported by a base cover with a plurality of insulated conductors supported by a top cover through an electric contact terminal. According to this connector, the top cover and the base cover are fitted together so as to enclose a container to which the electric contact terminal is attached.

CITATION LIST

Patent Literature

Patent Document 1: Japanese Unexamined Patent Application Publication No. H08-222291A

SUMMARY OF INVENTION

Technical Problem

With respect to the conductors being incorporated, it is sometimes necessary to handle conductors that are smaller than a regulation size. However, there is a problem in that it is burdensome to change the size of the overall connector in order to handle such small-size conductors. There has thus been demand for the ability to incorporate small-size conductors without changing the size of the overall connector.

Solution to Problem

A wire container according to one aspect of the present invention is an electrically-insulating wire container for containing a plurality of conductors, and within which a plurality of separate, substantially parallel tubular cavities are defined. Each of the tubular cavities includes a forward open end in a forward end portion of the wire container, and a rear open or closed end in a rear end portion on an opposite side of the wire container. The wire container has an integrated structure. The wire container is flexible enough that when the conductors are inserted into the tubular cavities from the long, narrow, and hollow forward open ends, and the wire container is combined with a connector having a plurality of piercing contacts, the piercing contacts penetrate the wire container and make contact with the conductors.

In this aspect, the conductors are inserted into the tubular cavities from the forward open ends, and the wire container is combined with the connector having the plurality of piercing contacts. At this time, the piercing contacts penetrate the wire container and make contact with the conductors so as to be electrically connected thereto. The conductors are inserted into the wire container, and thus can be handled in the same manner as when conductors having substantially large outer diameters are attached to the connector. It is thus possible to incorporate small-size conductors without changing the size of the overall connector.

Advantageous Effects of Invention

According to one aspect of the present invention, it is possible to incorporate small-size conductors without changing the size of the overall connector.

DESCRIPTION OF EMBODIMENT

Figure 1:
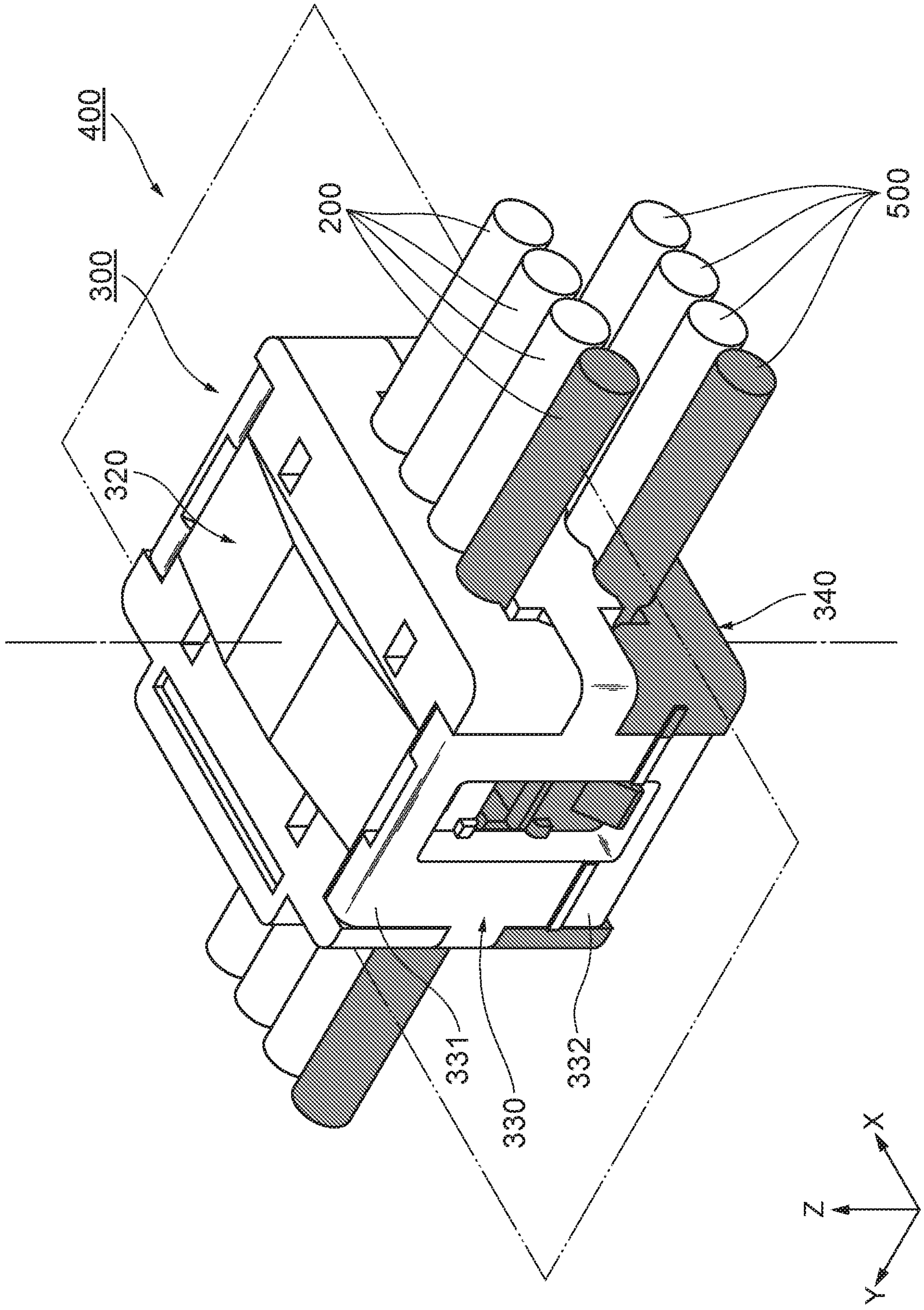
FIG. 1 is a perspective view of a connector assembly using a water-resistant connector according to an embodiment.
Figure 2:
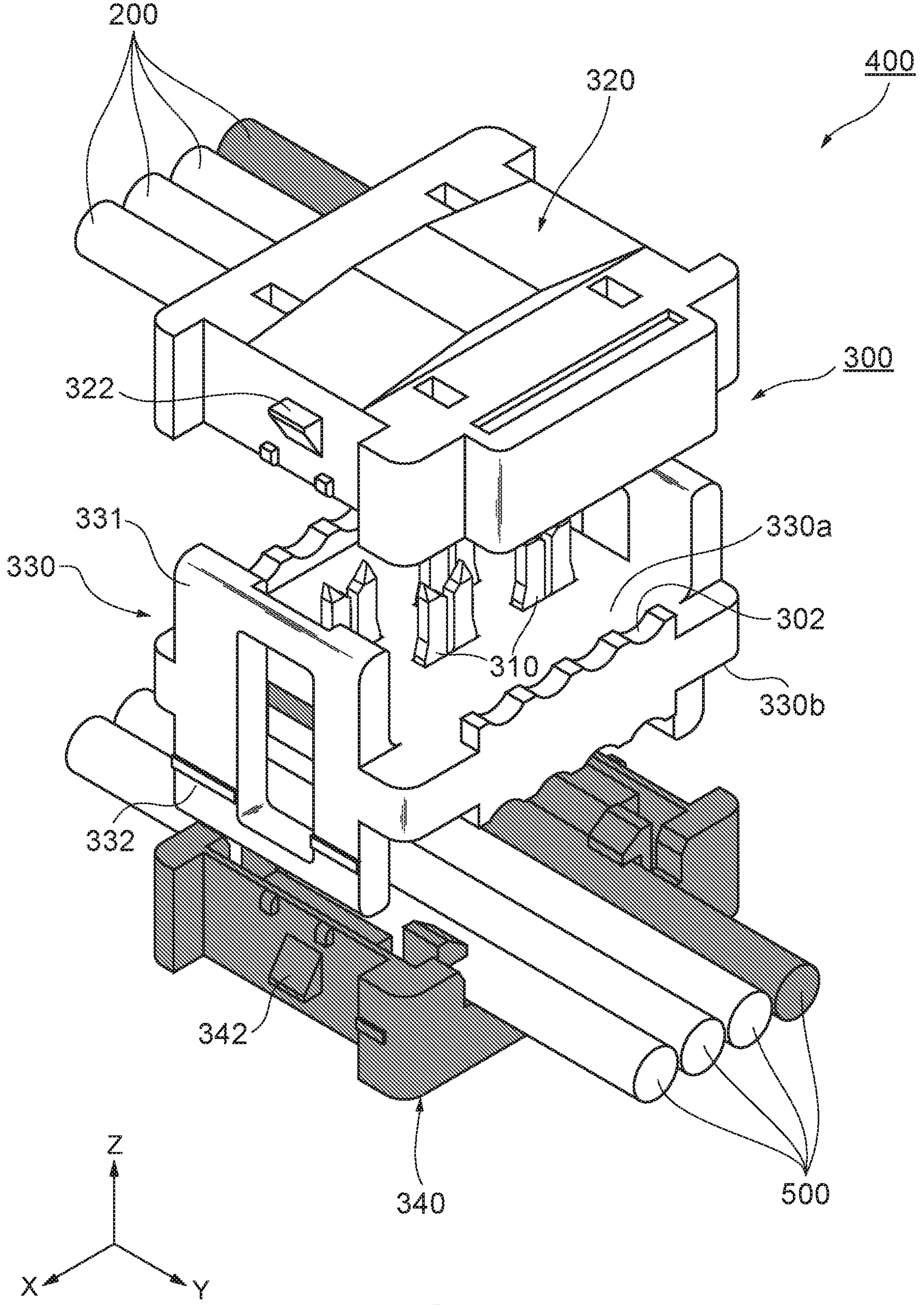
FIG. 2 is an exploded perspective view of a connector assembly according to an embodiment.
Figure 3B:
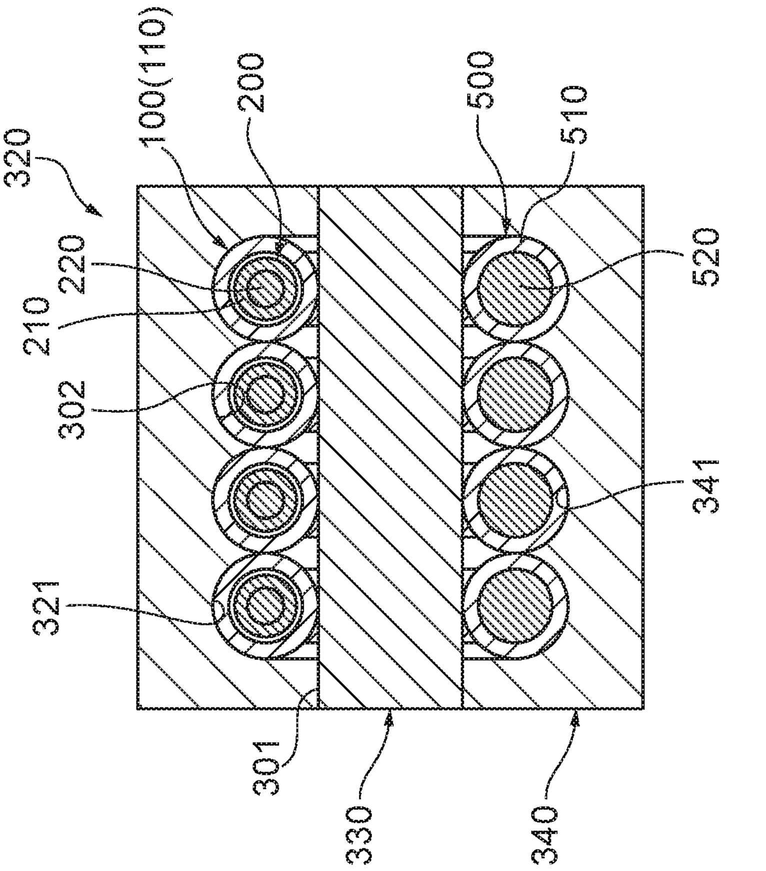
FIGS. 3A and 3B are conceptual diagrams illustrating states before and after the assembly of a connector assembly according to an embodiment.
Figure 3A:
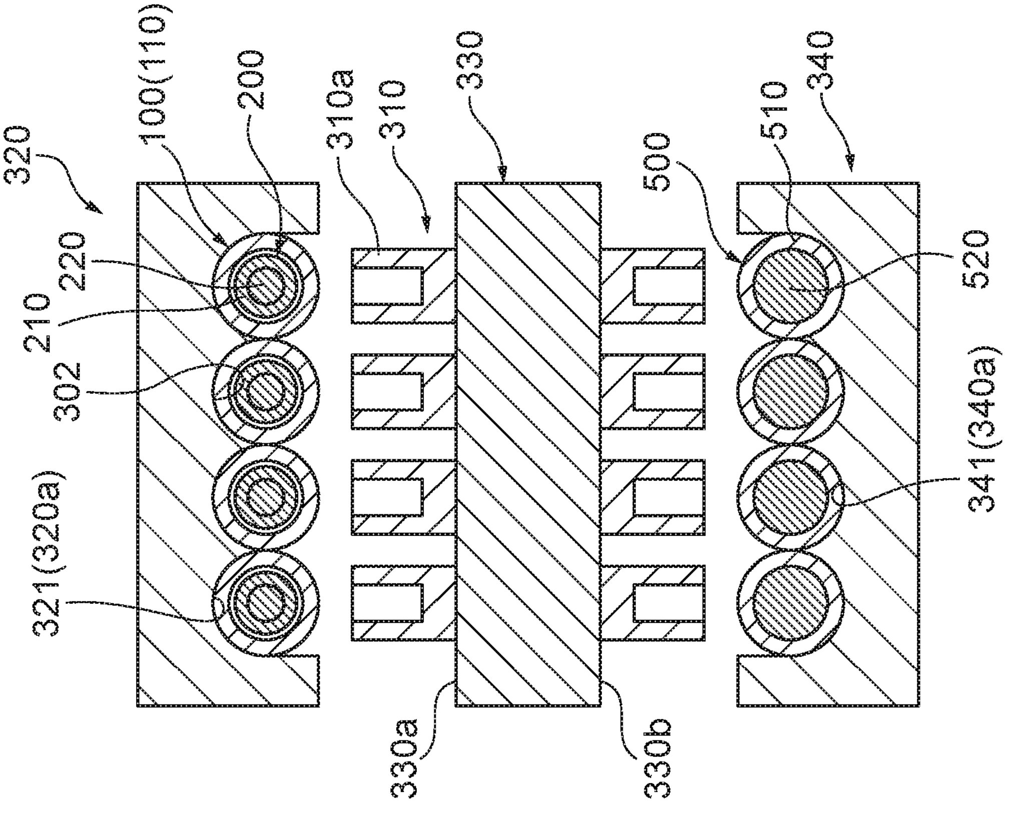

Embodiments of the present invention will be described below in detail with reference to the drawings. In the following description, the same or corresponding elements are given the same reference numerals, and duplicate explanations are omitted. Further, the terms “X-axis direction”, “Y-axis direction”, and “Z-axis direction” are terms of convenience based on directions illustrated in the drawing. Additionally, unless specified otherwise, the term “conductor” refers to conductors with or without insulating coverings. However, the embodiments will describe a case where a conductor having an insulating covering (in other words, an insulated conductor) is used as an example.

As illustrated in FIGS. 1 to 3B, a connector assembly 400 according to the present embodiment includes: a base part 330; a top cover 320 to be combined with the base part 330; a wire container 100, having a plurality of tubular cavities 120, arranged between the top cover 320 and the base part 330; a plurality of piercing contacts 310; first insulated conductors 200 inserted into the tubular cavities 120 of the wire container 100; a bottom cover 340 to be combined with the base part 330; and a plurality of second insulated conductors 500 disposed between the bottom cover 340 and the base part 330. Meanwhile, a water-resistant connector 300 according to the present embodiment includes the top cover 320 and base part 330 constituting a housing, and the plurality of tubular cavities 120 arranged within the housing. Note that it is sufficient for conductors 220 to be contained in the wire container 100, regardless of whether the conductors 220 have an insulating covering (insulation parts 210 indicated in FIGS. 3A and 3B). Although the present embodiment describes a case where the first insulated conductors 200 having the insulation parts 210 are contained, the conductors 220 may be contained within the wire container 100 with the insulation parts 210 removed therefrom, for example. Additionally, it is sufficient for conductors 520 to be disposed between the bottom cover 340 and the base part 330, regardless of whether the conductors 520 have an insulating covering (insulation parts 510 indicated in FIGS. 3A and 3B). Although the present embodiment describes a case where the second insulated conductors 500 having the insulation parts 510 are disposed between the bottom cover 340 and the base part 330, the conductors 520 may be disposed between the bottom cover 340 and the base part 330 with the insulation parts 510 removed therefrom, for example.

The present specification uses the terms "top" and "bottom (base)" assuming a state in which the first insulated conductors 200 and the second insulated conductors 500 extend in a horizontal direction, the second insulated conductors 500 are disposed on a bottom side, and the first insulated conductors 200 are disposed on a top side (the state illustrated in FIG. 1).

However, the orientation is not limited when the water-resistant connector 300 is being used. The descriptions will be given assuming an XYZ coordinate system is set for the housing of the water-resistant connector 300, for descriptive purposes. The "X-axis direction" and "Y-axis direction" are defined as directions orthogonal to each other in a horizontal plane, and the "Z-axis direction" is defined as a direction orthogonal to both the X-axis direction and the Y-axis direction.

The base part 330 is a rectangular plate-shaped member having a top surface 330*a* and a bottom surface 330*b*. The piercing contacts 310 extend upward from the top surface 330*a*. The piercing contacts 310 extend downward from the bottom surface 330*b*. Hook portions 331 for engaging with the top cover 320 extend upward, and hook portions 332 for engaging with the bottom cover 340 extend downward, from edge portions of the base part 330 opposite each other in the X-axis direction.

The top cover 320 is a rectangular plate-shaped member having a base surface 320*a* that supports the first insulated conductors 200. Four groove portions 321 for supporting four of the first insulated conductors 200 are arranged in the X-axis direction in the base surface 320*a*. These groove portions 321 are formed as semicircles extending in the Y-axis direction. Engagement portions 322 that can engage with the hook portions 331 of the base part 330 are formed on end portions of the top cover 320 opposite each other in the X-axis direction. By being attached to the base part 330, the top cover 320 can enclose the first insulated conductors 200 between the top cover 320 and the base part 330.

The bottom cover 340 is a rectangular plate-shaped member having a base surface 340*a* that supports the second insulated conductors 500. Four groove portions 341 for supporting four of the second insulated conductors 500 are arranged in the X-axis direction in the base surface 340*a*. These groove portions 341 are formed as semicircles extending in the Y-axis direction. Engagement portions 342 that can engage with the hook portions 332 of the base part 330 are formed on end portions of the bottom cover 340 opposite each other in the X-axis direction. By being attached to the base part 330, the bottom cover 340 can enclose the second insulated conductors 500 between the bottom cover 340 and the base part 330.

The plurality of piercing contacts 310 are electrically connected to the first insulated conductors 200 on the top cover 320 side and are electrically connected to the second insulated conductors 500 on the bottom cover 340 side. As a result, the plurality of first insulated conductors 200 on the top side and the plurality of second insulated conductors 500 on the bottom side are electrically connected to each other. In other words, each of the second insulated conductors 500 makes contact with a corresponding piercing contact 310, and each of the piercing contacts 310 provides electrical contact between corresponding ones of the first insulated conductors 200 and the second insulated conductors 500. The plurality of piercing contacts 310 are arranged at set intervals when viewed from the Y-axis direction. In the present embodiment, the plurality of piercing contacts 310 are staggered along the X-axis direction. The plurality of piercing contacts 310 include a plurality of IDC contacts 310*a* on the top side and the bottom side. Each of the IDC contacts 310*a* has blade portions that oppose each other. By using the top cover 320 to press the first insulated conductors 200 against the IDC contacts 310*a*, the IDC contacts 310*a* penetrate the wire container 100 and the insulation parts 210 of the insulated conductors, and contact the conductors 220. Note that the plurality of piercing contacts 310 are not limited to a given type, and may instead be a plurality of chisel contacts 310*b* that make contact with the conductors 220 by puncturing the conductors 220 (see FIG. 6B).

Figure 4:
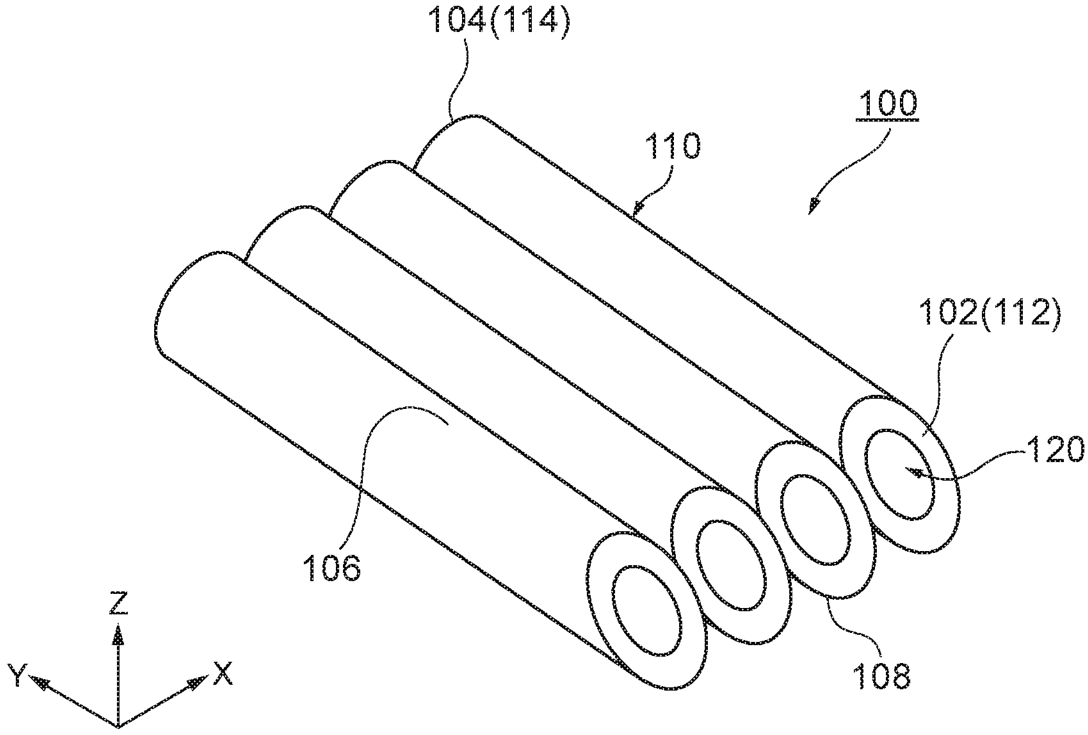
FIG. 4 is a perspective view of a wire container according to an embodiment.

The wire container 100 is a member that contains end portions of the first insulated conductors 200 so that the first insulated conductors 200 can be connected with the piercing contacts 310 even in the case where the first insulated conductors 200 are too narrow. As illustrated in FIG. 4, the wire container 100 includes a plurality of substantially parallel pipe-shaped main bodies 110. The pipe-shaped main bodies 110 extend parallel in the Y-axis direction, and are arranged in plural in the X-axis direction. The wire container 100 has an integrated structure. In other words, the pipe-shaped main bodies 110 are formed as an integrated entity through molding or the like, and are thus integrated with each other.

Each of the pipe-shaped main bodies 110 is defined by a corresponding one of the plurality of tubular cavities 120. Each of the tubular cavities 120 includes a forward open end 112 in a front end portion 102 of the wire container 100, and a rearward closed end 114 in an opposite-side rear end portion 104 of the wire container 100. In each of pairs of adjacent pipe-shaped main bodies 110, the tubular cavity 120 of one of the pipe-shaped main bodies 110 is electrically and mechanically isolated from the tubular cavity 120 of the other of the pipe-shaped main bodies 110. Additionally, there may be no openings between any of the adjacent tubular cavities 120 such that the tubular cavities 120 are sealed from each other, or adjacent tubular cavities 120 may be connected to each other through openings. However, from the standpoint of water resistance and insulation performance, it is desirable that no openings be present. The wire container 100 is flexible enough that when the first insulated conductors 200 are inserted into the tubular cavities 120 from the long, narrow, hollow forward open ends 112, and the wire container 100 is combined with the water-resistant connector 300 having the plurality of piercing contacts 310, the piercing contacts 310 penetrate the wire container 100 and make contact with the conductors 220. Note that the first insulated conductors 200 may be inserted into the tubular cavities 120 with the conductors 220 stripped and exposed (in other words, such that the conductors 220 do not have the insulating covering). A water-resistant material is preferable as the wire container 100, and silicon rubber or nitrile rubber is employed, for example.

Figure 5A:
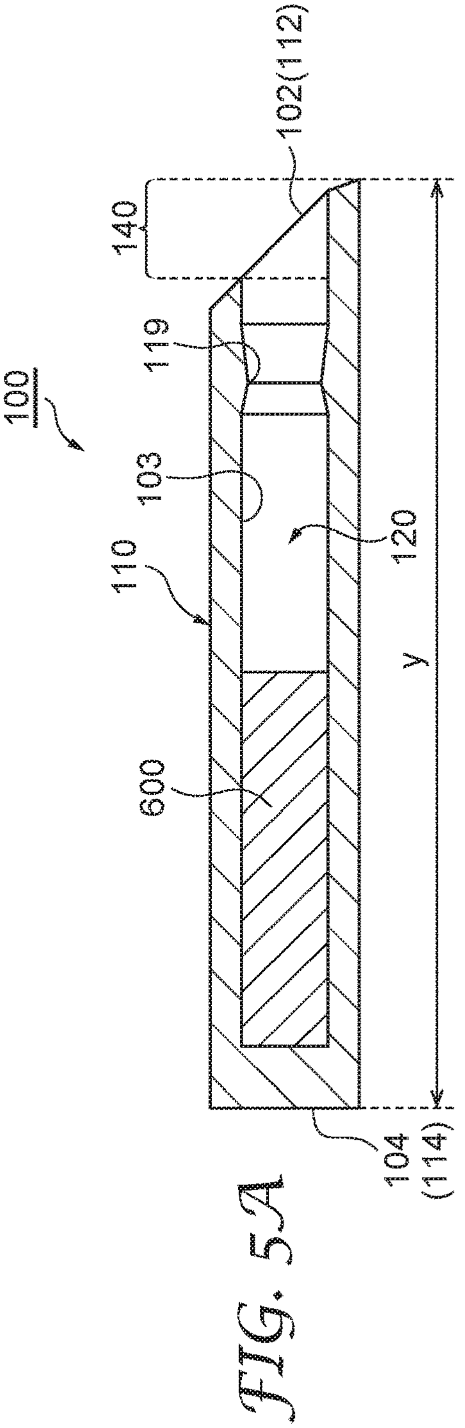
FIGS. 5A and 5B are cross-sectional views of a wire container according to an embodiment.
Figure 5B:
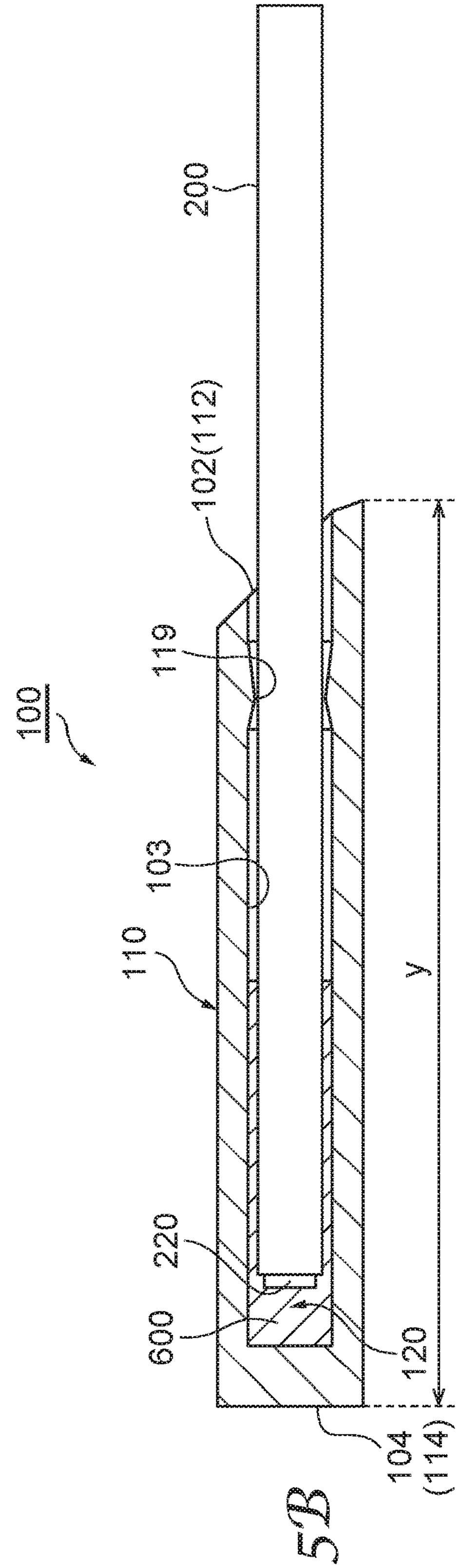

As illustrated in FIGS. 5A and 5B, the tubular cavities 120 are substantially filled with a lubricant 600 to facilitate the insertion of the first insulated conductors 200 into the tubular cavities 120. Grease (silicon-based grease, olefin-based grease, or the like), a gel, or the like can be employed as the lubricant 600. The tubular cavities 120 may be filled with the lubricant 600 in advance, before the first insulated conductors 200 are inserted. The lubricant 600 may instead be applied to only the inner surfaces of the tubular cavities 120. Alternatively, the leading end sides of the first insulated conductors 200 may be coated with the lubricant, and the first insulated conductors 200 may then be inserted into the tubular cavities 120 in that state. Note that the lubricant 600 may be replaced with a sealant to increase the water resistance, or a filler that functions as both a lubricant and a sealant may be employed.

Figure 6A:
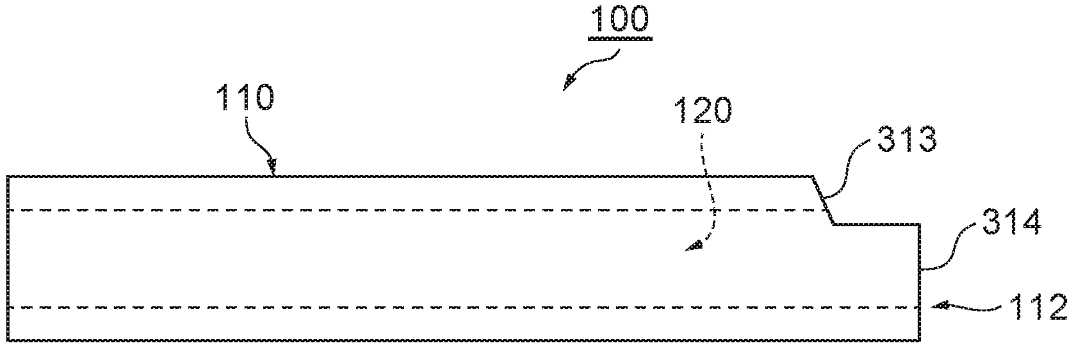
FIGS. 6A and 6B are diagrams illustrating a wire container and piercing contacts according to a modified example.
Figure 6B:
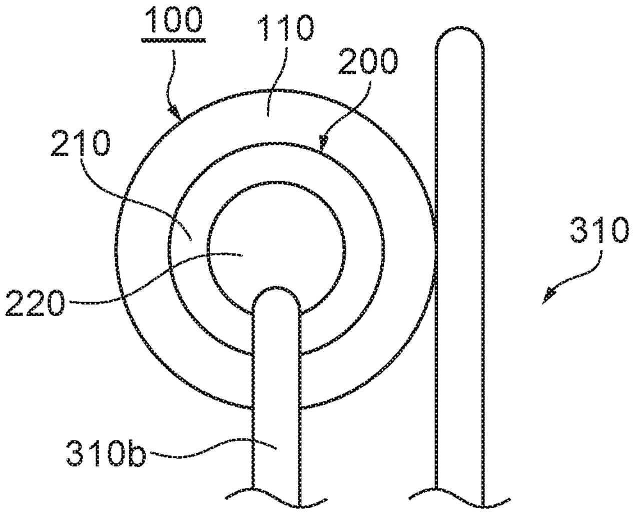

The forward open ends 112 of the pipe-shaped main bodies 110 are sloped to facilitate the insertion of the first insulated conductors 200 into the tubular cavities 120 of the pipe-shaped main bodies 110. Sloping the forward open ends 112 in this manner substantially increases the surface area of the entrances of the tubular cavities 120. It is thus easier to insert the leading ends of the first insulated conductors 200 into the entrances of the tubular cavities 120. Furthermore, by sloping the forward open ends 112, portions 140 in which inner surfaces 103 are partially exposed when viewed from above (see FIG. 5A) function as guide portions that guide the leading ends of the first insulated conductors 200 into the tubular cavities 120. The angle of the slope of the forward open ends 112 is not particularly limited, and may be from 30 to 60° relative to the horizontal direction, for example. With respect to the pipe-shaped main bodies 110, first portions 313 of the forward open ends 112 may be recessed relative to second portions 314 of the forward open ends rather than being sloped as illustrated in FIG. 6A in order to facilitate the insertion of the first insulated conductors 200 into the tubular cavities 120 of the pipe-shaped main bodies 110.

The diameter of each of the tubular cavities 120 will be described next. With respect to the pipe-shaped main bodies 110, the tubular cavity 120 of each pipe-shaped main body 110 may have the same diameter for at least 70% of the overall length of the tubular cavity 120, the same diameter for at least 80% of the overall length, or the same diameter for at least 90% of the overall length. Here, "same diameter" may be the same diameter as the diameter at the opening in the forward open end 112 of the pipe-shaped main body 110, or may be a different diameter from the forward open end 112. The diameter at the opening of the forward open end 112 may be greater than the "same diameter", and portions aside from the same diameter may have a smaller diameter. Although the diameters of the openings in the forward open ends 112 of the plurality of pipe-shaped main bodies 110 are the same in the present embodiment, the diameter at the opening in the forward open end 112 of at least one of the pipe-shaped main bodies 110 may be different from the diameter at the opening in the forward open end 112 of at least one other of the pipe-shaped main bodies 110.

Meanwhile, the pipe-shaped main bodies 110 may have constrictions 119 in the inner surfaces 103 of the pipe-shaped main bodies 110 such that the first insulated conductor 200 inserted into the tubular cavity 120 of at least one of the pipe-shaped main bodies 110 fits tightly therein. The constrictions 119 project toward the inner periphery from the inner surfaces 103 so as to locally constitute portions in which the diameter is smaller. The constrictions 119 are formed across the entire circumference of the inner surfaces 103 so as to have annular shapes.

The water resistance of the connector assembly 400 will be described next. When the conductors 220 of the first insulated conductors 200 are brought into contact electrically with the piercing contacts 310 by pressing the top cover 320 toward the base part 330, the pipe-shaped main bodies 110 are penetrated by the piercing contacts 310 and pressed against the top surface 330*a* of the base part 330. As a result, the pipe-shaped main bodies 110 seal a boundary area 301 between the top cover 320 and the base part 330. A sealant may also be applied to substantially fill a gap between the assembled base part 330 and top cover 320 to prevent moisture from entering the interior.

Figure 7:
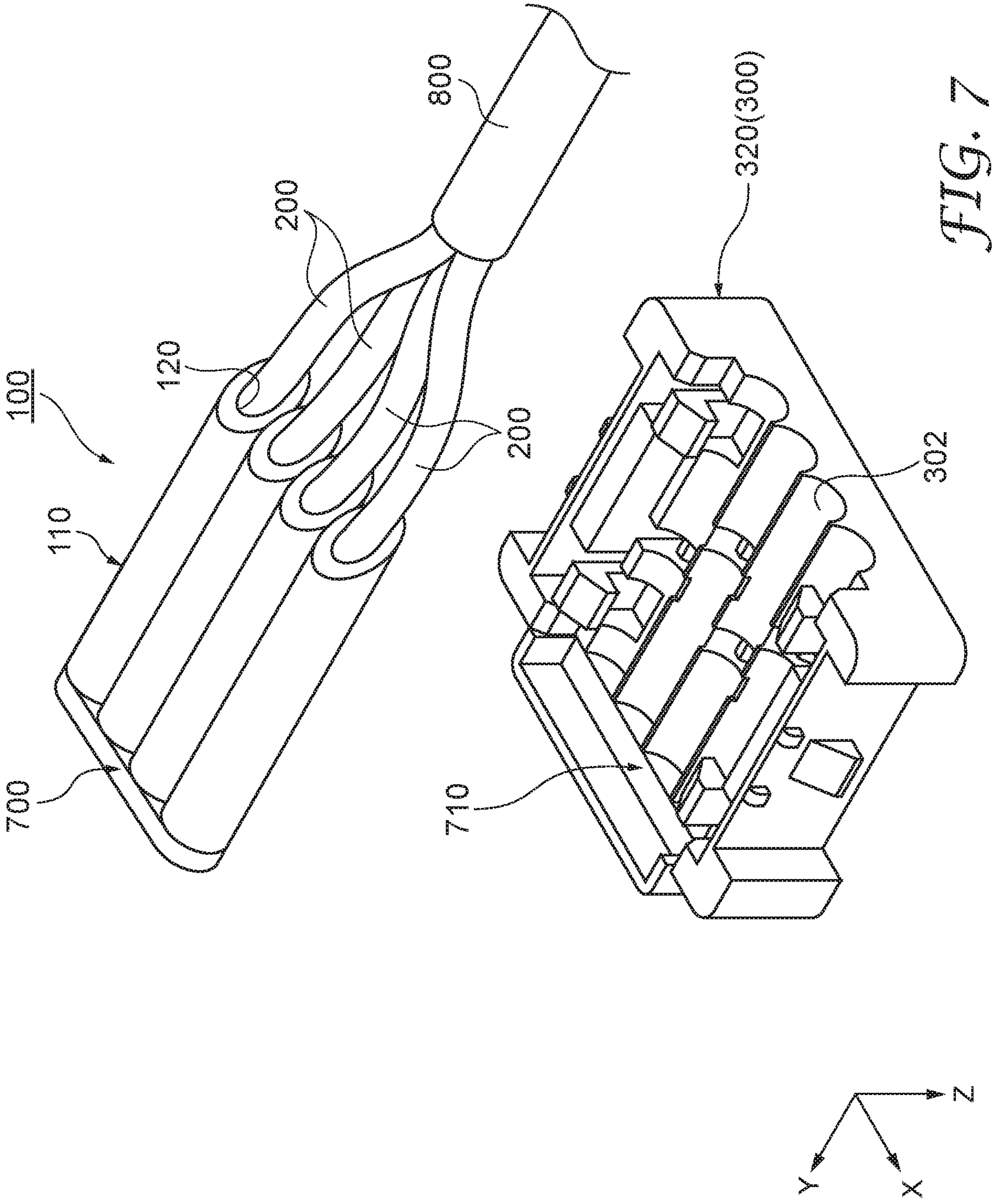
FIG. 7 is a diagram illustrating a top cover, along with a wire container according to a modified example.

As illustrated in FIG. 7, the wire container 100 may further include an anchoring part 700, disposed at the rear end portion 104 of the wire container 100, extending across the closed ends of the plurality of tubular cavities 120. In this case, when the wire container 100 is attached to the water-resistant connector 300, the anchoring part 700 of the wire container 100 is clamped by a receptacle portion 710 of the water-resistant connector 300 and anchored thereby. The receptacle portion 710 is provided in an end portion of the top cover 320 with respect to the Y-axis direction. The anchoring part 700 is formed having a size and shape that fit into the receptacle portion 710. When the engagement portions 322 of the top cover 320 and the hook portions 331 of the base part 330 are engaged (see FIG. 2), the anchoring part 700 is clamped between the top cover 320 and the base part 330 in the receptacle portion 710 and is anchored thereby.

Actions and effects of the wire container 100, the connector assembly, and the water-resistant connector 300 according to the present embodiment will be described next.

In the wire container 100 according to the present embodiment, the first insulated conductors 200 (the conductors 220) are inserted into the tubular cavities 120 from the forward open ends 112, and the wire container 100 is combined with the water-resistant connector 300 having the plurality of piercing contacts 310. At this time, the piercing contacts 310 penetrate the wire container 100 and make contact with the conductors 220 so as to be electrically connected thereto. The first insulated conductors 200 are inserted into the wire container 100, and thus can be handled in the same manner as when first insulated conductors 200 having substantially large outer diameters are attached to the connector. It is thus possible to incorporate small-size first insulated conductors 200 without changing the size of the overall connector. The wire container 100 also has a function of aligning a round cable, which consolidates the plurality of first insulated conductors 200, into flat cable form. For example, as illustrated in FIG. 7, an insulating covering of a round cable 800 is removed to expose the plurality of first insulated conductors 200, which are then contained in the tubular cavities 120 of the wire container 100. The plurality of first insulated conductors 200 in the round cable 800 are aligned into flat cable form as a result.

The wire container 100 according to the present embodiment is flexible enough that when the first insulated conductors 200 are inserted into the tubular cavities 120 and the wire container 100 is combined with the connector 300 having the plurality of piercing contacts 310, the piercing contacts 310 penetrate the wire container 100 and the insulation parts 210 of the first insulated conductors 200, and make contact with the conductors 220. As a result, the piercing contacts 310 penetrate the wire container 100 and the insulation parts 210, and are electrically connected to the conductors 220.

In the wire container 100 according to the present embodiment, rear end portions of the tubular cavities 120 are closed ends. In this case, when the tubular cavities 120 are filled with a filler, for example, the filler can be held within the tubular cavities 120.

The wire container 100 according to the present embodiment may further include the anchoring part 700, disposed at the rear end portion of the wire container 100, extending across the closed ends of the plurality of tubular cavities 120, and when the wire container 100 is attached to the water-resistant connector 300, the anchoring part 700 of the wire container 100 may be clamped by the receptacle portion 710 of the water-resistant connector 300 and anchored thereby. As a result, the wire container 100 can be fully anchored to the water-resistant connector 300.

The wire container 100 according to the present embodiment further includes the plurality of substantially parallel pipe-shaped main bodies 110, and each of the pipe-shaped main bodies 110 defines a single one of the plurality of tubular cavities 120. As a result, the first insulated conductors 200 can be handled as insulated conductors having the outer diameter of the pipe-shaped main bodies 110.

In the wire container 100 according to the present embodiment, at least one of the tubular cavities 120 is substantially filled with the lubricant 600 for facilitating the insertion of the conductors 220 into at least one of the tubular cavities 120. As a result, the conductors 220 can be inserted into the tubular cavities 120 with ease.

The connector assembly 400 according to the present embodiment includes: the base part 330; the top cover 320 to be combined with the base part 330; the plurality of pipe-shaped main bodies 110, disposed between the top cover 320 and the base part 330, with a hollow tube in each of the pipe-shaped main bodies 110 having the forward open end 112 and a rear end portion 104; the plurality of piercing contacts 310; and the conductors 220 inserted into the pipe-shaped main bodies 110 from larger openings in the pipe-shaped main bodies 110. The pipe-shaped main bodies 110 are flexible enough that the piercing contacts 310 penetrate the corresponding pipe-shaped main bodies 110 and make contact with the conductors 220 inserted into the pipe-shaped main bodies 110, and at least one of the pipe-shaped main bodies 110 seals the boundary area 301 between the top cover 320 and the base part 330.

According to this connector assembly 400, the same actions and effects as the above-described wire container 100 can be achieved. Additionally, the pipe-shaped main bodies 110 seal the boundary area 301 between the top cover 320 and the base part 330. This makes it possible to improve the water resistance.

The connector assembly 400 according to the present embodiment further includes the bottom cover 340 to be combined with the base part 330 and the plurality of second insulated conductors 500. The plurality of conductors 520 are disposed between the bottom cover 340 and the base part 330, and make contact with corresponding ones of the piercing contacts 310, with the piercing contacts 310 providing electrical contact between the corresponding conductors 220 and conductors 520.

In the connector assembly 400 according to the present embodiment, the rear end portions of the pipe-shaped main bodies 110 are closed. In this case, when the tubular cavities 120 are filled with a filler, for example, the filler can be held within the tubular cavities 120.

The water-resistant connector 300 according to the present embodiment includes the housing and the plurality of pipe-shaped main bodies 110 disposed within the housing. Each of the pipe-shaped main bodies 110 includes a forward open end 112 and a rearward closed end 114, and the pipe-shaped main bodies 110 are formed so as to receive the plurality of first insulated conductors 200 of a cable from the forward open ends 112 of the pipe-shaped main bodies 110. The pipe-shaped main bodies 110 substantially prevent moisture from entering the housing of the water-resistant connector 300.

According to this water-resistant connector 300, the same actions and effects as the above-described wire container 100 can be achieved. Furthermore, the pipe-shaped main bodies 110 substantially prevent moisture from entering the housing, and can therefore improve the water resistance as well.

In the water-resistant connector 300 according to the present embodiment, the plurality of pipe-shaped main bodies 110 have an integrated structure. In this case, the pipe-shaped main bodies 110 having an integrated structure can increase the water resistance.

The present invention is not limited to the embodiments described above.

For example, although the foregoing describes there being four of each of the first insulated conductors and the second insulated conductors, the number of insulated conductors may be higher or lower.

Additionally, the rear end portions of the pipe-shaped main bodies may be the open ends. In this case, the diameters of the openings on the forward end portion side and the diameters of the openings on the rear end portion side may be equal. Alternatively, the diameters of the openings on the rear end portion side may be smaller than the diameters of the openings on the forward end portion side.

The following is a list of representative embodiments of the present disclosure.

Embodiment 1 is an electrically-insulating wire container 100, including a plurality of substantially parallel pipe-shaped main bodies 110, for containing a plurality of conductors 220, wherein each of the pipe-shaped main bodies defines, in its interior, a pipe-shaped cavity 120 extending along a lengthy of the pipe-shaped main body, from a first open end 112 of the pipe-shaped main body on a forward end portion 102 of the wire container to a second open or closed end 114 of the pipe-shaped main body at a closed end 114 of the pipe-shaped main body at a rear end portion 104 on the opposite side of the wire container; the wire container has an integrated structure; and the pipe-shaped main bodies are flexible enough that when the conductors 220 are inserted into the pipe-shaped cavities and the wire container is combined with a connector 300 having a plurality of piercing contacts 310, the piercing contacts penetrate corresponding pipe-shaped main bodies and make contact with the conductors.

Embodiment 2 is the wire container according to Embodiment 1, wherein the second open or closed end of each pipe-shaped main body is a closed end.

Embodiment 3 is the wire container according to Embodiment 1, wherein the second open or closed end of each pipe-shaped main body is an open end; the first open ends of the pipe-shaped main bodies have a first opening diameter; and the second open ends of the pipe-shaped main bodies have a second opening diameter equal to the first opening diameter.

Embodiment 4 is the wire container according to Embodiment 1, wherein the second open or closed end of each pipe-shaped main body is an open end; the first open ends of the pipe-shaped main bodies have a first opening diameter; and the second open ends of the pipe-shaped main bodies have a second opening diameter smaller than the first opening diameter.

Embodiment 5 is the wire container according to Embodiment 1, wherein the pipe-shaped main bodies are flexible enough that when insulated conductors 200 are inserted into the pipe-shaped cavities and the wire container is combined with a connector 300 having a plurality of piercing contacts 310, the piercing contacts penetrate corresponding pipe-shaped main bodies and insulation parts 210 of the insulated conductors, and make contact with the conductors 220.

Embodiment 6 is the wire container according to Embodiment 1, wherein in each of pairs of adjacent ones of the pipe-shaped main bodies, the pipe-shaped cavity of one of the pipe-shaped main bodies is electrically and mechanically isolated from the pipe-shaped cavity of the other of the pipe-shaped main bodies.

Embodiment 7 is the wire container according to Embodiment 1, wherein no openings are present between any adjacent ones of the pipe-shaped cavities.

Embodiment 8 is the wire container according to Embodiment 1, wherein the first open end 112 of at least one of the pipe-shaped main bodies 110 is sloped so as to facilitate the insertion of the conductor 220 into the pipe-shaped cavity of at least one of the pipe-shaped main bodies.

Embodiment 9 is the wire container according to Embodiment 1, wherein in at least one of the pipe-shaped main bodies 110, a first portion 313 of the first open end 112 is recessed relative to a second portion 314 of the first open end so as to facilitate the insertion of the conductor 220 into the pipe-shaped cavity of at least one of the pipe-shaped main bodies.

Embodiment 10 is the wire container according to Embodiment 1, wherein in at least one of the pipe-shaped main bodies, the pipe-shaped cavity of the pipe-shaped main body has the same diameter for at least 70% of an overall length of the pipe-shaped cavity.

Embodiment 11 is the wire container according to Embodiment 1, wherein in at least one of the pipe-shaped main bodies, the pipe-shaped cavity of the pipe-shaped main body has the same diameter for at least 80% of an overall length of the pipe-shaped cavity.

Embodiment 12 is the wire container according to Embodiment 1, wherein in at least one of the pipe-shaped main bodies, the pipe-shaped cavity of the pipe-shaped main body has the same diameter for at least 90% of an overall length of the pipe-shaped cavity.

Embodiment 13 is the wire container according to Embodiment 10, 11, or 12, wherein the same diameter is the first opening diameter of the first open end of at least one of the pipe-shaped main bodies.

Embodiment 14 is the wire container according to Embodiment 1, wherein the plurality of pipe-shaped main bodies define an upper wave-shaped surface 106 of the wire container and a lower wave-shaped surface 108 of the wire container.

Embodiment 15 is the wire container according to Embodiment 14, wherein when the wire container is combined with the connector 300, the wire container is received by a wave-shaped surface 302 of the connector that substantially complements at least one of the upper and lower wave-shaped surfaces of the wire container.

Embodiment 16 is the wire container according to Embodiment 1, wherein when the wire container is combined with the connector 300, the wire container is anchored between the first portion 320 and the second portion 330 of the connector.

Embodiment 17 is the wire container according to Embodiment 1, wherein when the wire container is combined with the connector 300, substantially the entire wire container is disposed within the connector.

Embodiment 18 is the wire container according to Embodiment 1, wherein the first opening diameter of the first open end of at least one of the pipe-shaped main bodies is different from the first opening diameter of the first open end of at least one other of the pipe-shaped main bodies.

Embodiment 19 is the wire container according to Embodiment 1, wherein an inner surface 103 of at least one of the pipe-shaped main bodies is lubricated by a lubricant 600 for facilitating the insertion of the conductor 220 into the pipe-shaped cavity of at least one of the pipe-shaped main bodies.

Embodiment 20 is the wire container according to Embodiment 1, wherein the pipe-shaped cavity of at least one of the pipe-shaped main bodies is substantially filled with a lubricant 600 for facilitating the insertion of the conductor 220 into the pipe-shaped cavity of at least one of the pipe-shaped main bodies.

Embodiment 21 is the wire container according to Embodiment 1, wherein the wire container is made from a water-resistant viscoelastic material.

Embodiment 22 is the wire container according to Embodiment 1, wherein each of the plurality of piercing contacts includes an IDC contact 310*a*.

Embodiment 23 is the wire container according to Embodiment 1, wherein each of the plurality of piercing contacts includes a chisel contact 310*b*.

Embodiment 24 is the wire container according to Embodiment 1, wherein a constriction 119 is formed in an inner surface 103 of at least one of the pipe-shaped main bodies such that at least one of the pipe-shaped main bodies fits tightly with the conductor inserted into the pipe-shaped cavity of the at least one of the pipe-shaped main bodies.

Embodiment 25 is the wire container according to Embodiment 24, wherein the constriction has an annular shape.

Embodiment 26 is the wire container according to Embodiment 1, wherein the pipe-shaped main bodies form a single row of pipe-shaped main bodies.

Embodiment 27 is an electrically-insulating wire container 100, for containing a plurality of conductors 220, and within which a plurality of separate, substantially parallel tubular cavities 120 are defined, wherein each of the tubular cavities includes a forward open end 112 in a forward end portion 102 of the wire container, and a rear closed end 114 in a rear end portion 104 on an opposite side of the wire container; the wire container has an integrated structure; and the wire container is flexible enough that when the conductors 220 are inserted into the tubular cavities from the long, narrow, and hollow forward open ends, and the wire container is combined with a connector 300 having a plurality of piercing contacts 310, the piercing contacts penetrate the wire container and make contact with the conductors.

Embodiment 28 is the wire container according to Embodiment 27, wherein the wire container is flexible enough that when the insulated conductors 200 are inserted into the tubular cavities and the wire container is combined with the connector 300 having the plurality of piercing contacts 310, the piercing contacts penetrate the wire container and insulation parts 210 of the insulated conductors, and make contact with the conductors 220.

Embodiment 29 is the wire container according to Embodiment 27, wherein the tubular cavities form a single row of tubular cavities.

Embodiment 30 is a water-resistant connector assembly 400 including: a base part 330; a top cover 320 to be combined with the base part; a plurality of hollow tubes 110, disposed between the top cover and the base part, each hollow tube 110 having a forward opening 112 and a rear end portion 104; a plurality of piercing contacts 310; and first conductors 220 inserted into the hollow tubes from larger forward openings in the hollow tubes, wherein the hollow tubes are flexible enough that the piercing contacts penetrate the corresponding hollow tubes and make contact with the conductors inserted into the hollow tubes; and at least one of the hollow tubes seals a boundary area 301 between the top cover and the base part.

Embodiment 31 is the water-resistant connector assembly according to Embodiment 30, wherein the plurality of piercing contacts include a plurality of IDC contacts 310*a*.

Embodiment 32 is the water-resistant connector assembly according to Embodiment 30, wherein the plurality of piercing contacts include a plurality of chisel contacts 310*b*.

Embodiment 33 is the water-resistant connector assembly according to Embodiment 30, further including: a bottom cover 340 to be combined with the base part; and a plurality of second conductors 520, disposed between the bottom cover and the base part, the second conductors making contact with corresponding ones of the piercing contacts, with the piercing contacts providing electrical contact between the corresponding first conductors and second conductors 520.

Embodiment 34 is the water-resistant connector assembly according to Embodiment 30, wherein the plurality of hollow tubes have an integrated structure.

Embodiment 35 is the water-resistant connector assembly according to Embodiment 30, wherein the rear end portion of each of the hollow tubes is closed.

Embodiment 36 is the water-resistant connector assembly according to Embodiment 30, wherein the rear end portion of each of the hollow tubes includes a rear opening.

Embodiment 37 is the water-resistant connector assembly according to Embodiment 30, wherein the rear openings are smaller than the forward openings of the hollow tubes.

Embodiment 38 is the water-resistant connector assembly according to Embodiment 30, wherein the forward openings and the rear openings are the same size.

Embodiment 39 is the water-resistant connector assembly according to Embodiment 30, wherein an interior of at least one of the hollow tubes is lubricated.

Embodiment 40 is the water-resistant connector assembly according to Embodiment 30, wherein a gap between each of the first conductors and the hollow tubes into which the first conductors are inserted is at least partially filled with a sealant.

Embodiment 41 is the water-resistant connector assembly according to Embodiment 30, further including: a sealant that substantially fills a gap between the first conductors and the hollow tubes into which the first conductors are inserted.

Embodiment 42 is the water-resistant connector assembly according to Embodiment 30, further including: a sealant, substantially filling a gap arising between the base part and the top cover after those parts are assembled, in order to prevent moisture from entering.

Embodiment 43 is a water-resistant connector 300 including: a housing 320+330; and a plurality of hollow tubes 110 disposed within the housing, each of the hollow tubes having an open front end portion 112 and a closed rear end portion 104, the hollow tubes being formed so as to receive a plurality of conductors 220 of a cable from the open forward end portions of the hollow tubes, and the hollow tubes substantially preventing moisture from entering the housing of the connector.

Embodiment 44 is the water-resistant connector according to Embodiment 43, wherein the plurality of hollow tubes have an integrated structure.

Embodiment 45 is the water-resistant connector according to Embodiment 43, further including: a sealant that substantially fills a gap between the hollow tubes and the conductors received by the hollow tubes.

Embodiment 46 is the water-resistant connector according to Embodiment 43, further including: a sealant that substantially fills a gap on the inside of the connector.

REFERENCE SIGNS LIST

100 Wire container
110 Pipe-shaped main body (hollow tube)
120 Tubular cavity
200 First insulated conductor
210 Insulation part
220 Conductor
300 Water-resistant connector
310 Piercing contact
320 Top cover
330 Base part
340 Bottom cover
400 Connector assembly
500 Second insulated conductor

The invention claimed is:

1. An electrically-insulating wire container, for containing a plurality of conductors, and within which a plurality of separate, substantially parallel tubular cavities are defined, wherein each of the tubular cavities includes a forward open end in a forward end portion of the wire container, and a rear open or closed end in a rear end portion on an opposite side of the wire container;

the wire container has an integrated structure wherein at least two of the tubular cavities are directly adjacent one another; and the wire container is flexible enough that when the conductors are inserted into the tubular cavities from the long, narrow, and hollow forward open ends, and the wire container is combined with a connector having a plurality of piercing contacts, the piercing contacts penetrate the wire container and make contact with the conductors.

2. The wire container according to claim 1, wherein the wire container is flexible enough that when insulated conductors are inserted into the tubular cavities and the wire container is combined with the connector having the plurality of piercing contacts, the piercing contacts penetrate the wire container and insulation parts of the insulated conductors, and make contact with the conductors.

3. The wire container according to claim 1, wherein the rear open or closed end of each of the tubular cavities is a closed end.

4. The wire container according to claim 3, further comprising:

an anchoring part, disposed at the rear end portion of the wire container, extending across the closed ends of the plurality of tubular cavities, wherein when the wire container is attached to the connector, the anchoring part of the wire container is clamped by a receptacle portion of the connector and is anchored as a result.

5. The wire container according to claim 1, further comprising:

a plurality of substantially parallel pipe-shaped main bodies, wherein each of the pipe-shaped main bodies defines a single one of the plurality of tubular cavities.

6. The wire container according to claim 1, wherein at least one of the tubular cavities is substantially filled with a lubricant for facilitating the insertion of the conductors into at least one of the tubular cavities.

7. The wire container according to claim 1, wherein at least two of the tubular cavities are in contact with one another.

8. The wire container according to claim 1, wherein at least three of the tubular cavities are parallel and aligned in a row.

9. A connector assembly comprising:

a base part;

a top cover to be combined with the base part;

a plurality of hollow tubes, disposed between the top cover and the base part, each hollow tube having a forward open end and a rear end portion;

a plurality of piercing contacts; and first conductors inserted into the hollow tubes from larger openings in the hollow tubes, wherein the hollow tubes are flexible enough that the piercing contacts penetrate the corresponding hollow tubes and make contact with the conductors inserted into the hollow tubes; and at least one of the hollow tubes seals a boundary area between the top cover and the base part.

10. The connector assembly according to claim 9, further comprising:

a bottom cover to be combined with the base part; and a plurality of second conductors, disposed between the bottom cover and the base part, the second conductors making contact with corresponding ones of the piercing contacts, with the piercing contacts providing electrical contact between the corresponding first conductors and second conductors.

11. The connector assembly according to claim 9, wherein the rear end portion of each of the hollow tubes is closed.

12. A water-resistant connector comprising:

a housing; and a plurality of hollow tubes disposed within the housing, each of the hollow tubes having a forward open end and a rear closed end, the hollow tubes being formed so as to receive a plurality of conductors of a cable from the forward open ends of the hollow tubes, and the hollow tubes substantially preventing moisture from entering the housing of the connector.

13. The water-resistant connector according to claim 12, wherein the plurality of hollow tubes have an integrated structure.

* * * * *